(12) United States Patent
Boehm et al.

(10) Patent No.: US 11,073,058 B2
(45) Date of Patent: Jul. 27, 2021

(54) DEVICE FOR SUPPLYING A FLUID AT RISK OF FREEZING TO THE COMBUSTION CHAMBERS OF AN INTERNAL COMBUSTION ENGINE

(71) Applicant: Bayerische Motoren Werke Aktiengesellschaft, Munich (DE)

(72) Inventors: Martin Boehm, Poecking (DE); Andreas Bruhn, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/966,754

(22) PCT Filed: Jan. 22, 2019

(86) PCT No.: PCT/EP2019/051451
§ 371 (c)(1),
(2) Date: Jul. 31, 2020

(87) PCT Pub. No.: WO2019/149566
PCT Pub. Date: Aug. 8, 2019

(65) Prior Publication Data
US 2020/0355105 A1    Nov. 12, 2020

(30) Foreign Application Priority Data
Feb. 1, 2018 (DE) .................. 10 2018 201 564.3

(51) Int. Cl.
*F01N 3/20* (2006.01)
*F02M 25/025* (2006.01)
*F02M 25/022* (2006.01)

(52) U.S. Cl.
CPC ......... *F01N 3/2066* (2013.01); *F02M 25/025* (2013.01); *F01N 2610/1406* (2013.01);
(Continued)

(58) Field of Classification Search
CPC ..... F01N 2610/1406; F01N 2610/1426; F01N 2610/1466; F01N 3/02; F01N 3/2066;
(Continued)

(56) References Cited

U.S. PATENT DOCUMENTS 4,406,255 A * 9/1983 Goodman .......... F02M 25/0227
123/25 J
4,416,225 A * 11/1983 Constantine ....... F02M 25/0228
123/25 E (Continued)

FOREIGN PATENT DOCUMENTS

DE    10 2004 054 238 A1    5/2006
DE    10 2007 026 944 A1    12/2008
(Continued)

OTHER PUBLICATIONS

International Search Report (PCT/ISA/210) issued in PCT Application No. PCT/EP2019/051451 dated Mar. 19, 2019 with English translation (five (5) pages).
(Continued)

*Primary Examiner* — Jesse S Bogue
(74) *Attorney, Agent, or Firm* — Crowell & Moring LLP

(57) ABSTRACT

A device for supplying a liquid at risk of freezing to the combustion chambers of an internal combustion engine, in particular an internal combustion engine driving a motor vehicle, is designed to convey the liquid at risk of freezing at least from a section of a supply line, through which the liquid travels from a storage container to a supply unit to the internal combustion engine, back to the storage container. In addition, an aeration valve is provided near to the supply unit and branching off from the supply line, via which the supply line is connected to the environment in the open state. When viewed in the direction of the storage container, downstream of the aeration valve, an air separation/pressure reservoir structural unit connected to the supply line is
(Continued)

provided, which is designed to at least proportionally discharge air content out of the supply line and out of the liquid located in the supply line in a section positioned at the top in the mounted state, and to act as a pressure reservoir acting on the liquid in the supply line.

8 Claims, 1 Drawing Sheet

(52) U.S. Cl.
CPC ............... *F01N 2610/1426* (2013.01); *F01N 2610/1466* (2013.01); *F02M 25/0222* (2013.01); *F02M 25/0227* (2013.01)

(58) Field of Classification Search
CPC ........... F02M 25/0222; F02M 25/0227; F02M 25/025; Y02T 10/12
See application file for complete search history.

(56) References Cited

U.S. PATENT DOCUMENTS

| | | | | |
|---|---|---|---|---|
| 4,448,153 A | * | 5/1984 | Miller | ............... F02M 25/028 |
| | | | | 123/25 J |
| 4,637,351 A | * | 1/1987 | Pakula | ............... F02M 25/0222 |
| | | | | 123/25 J |
| 5,823,149 A | * | 10/1998 | Mezheritsky | ........... F02B 47/02 |
| | | | | 123/25 A |
| 2007/0068525 A1 | | 3/2007 | Offenhuber et al. | |
| 2007/0283685 A1 | | 12/2007 | Ripper et al. | |
| 2009/0277162 A1 | * | 11/2009 | Cominetti | ............... F01N 3/206 |
| | | | | 60/297 |

FOREIGN PATENT DOCUMENTS

| | | |
|---|---|---|
| DE | 10 2009 032 489 A1 | 1/2011 |
| DE | 10 2010 030 050 A1 | 12/2011 |
| DE | 10 2014 204 509 A1 | 9/2015 |
| DE | 10 2017 121 754 A1 | 11/2017 |
| EP | 2 447 490 A1 | 5/2012 |

OTHER PUBLICATIONS

German-language Written Opinion (PCT/ISA/237) issued in PCT Application No. PCT/EP2019/051451 dated Mar. 19, 2019 (six (6) pages).

German-language Search Report issued in German Application No. 10 2018 201 564.3 dated Jan. 18, 2019 with partial English translation (11 pages).

\* cited by examiner

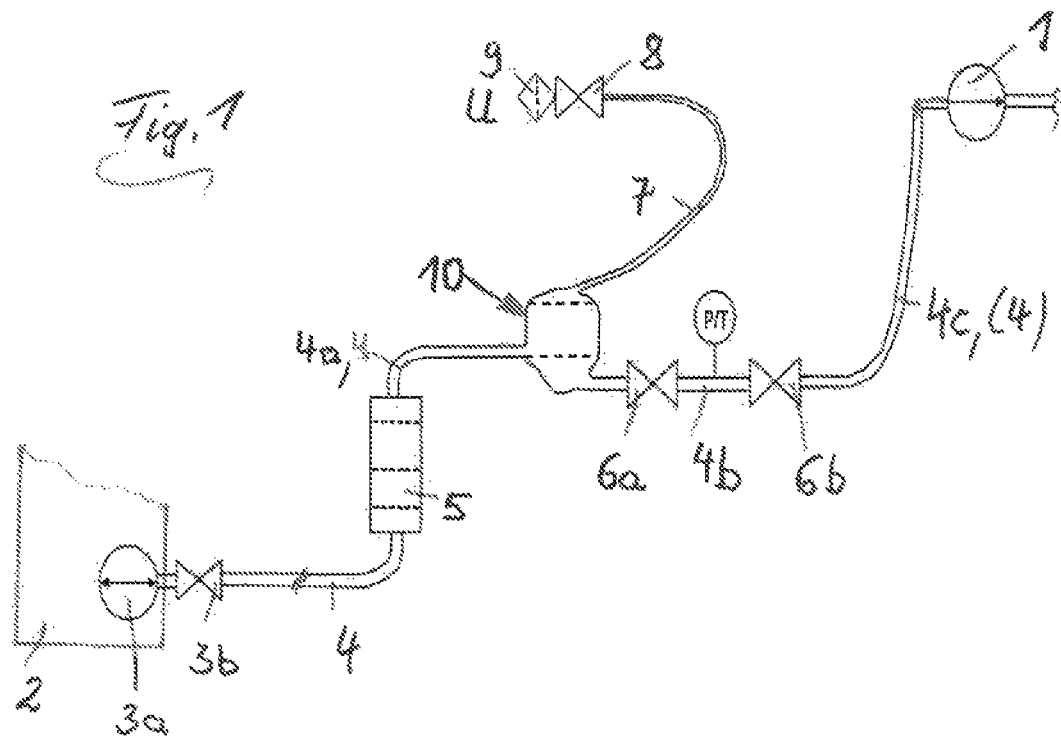
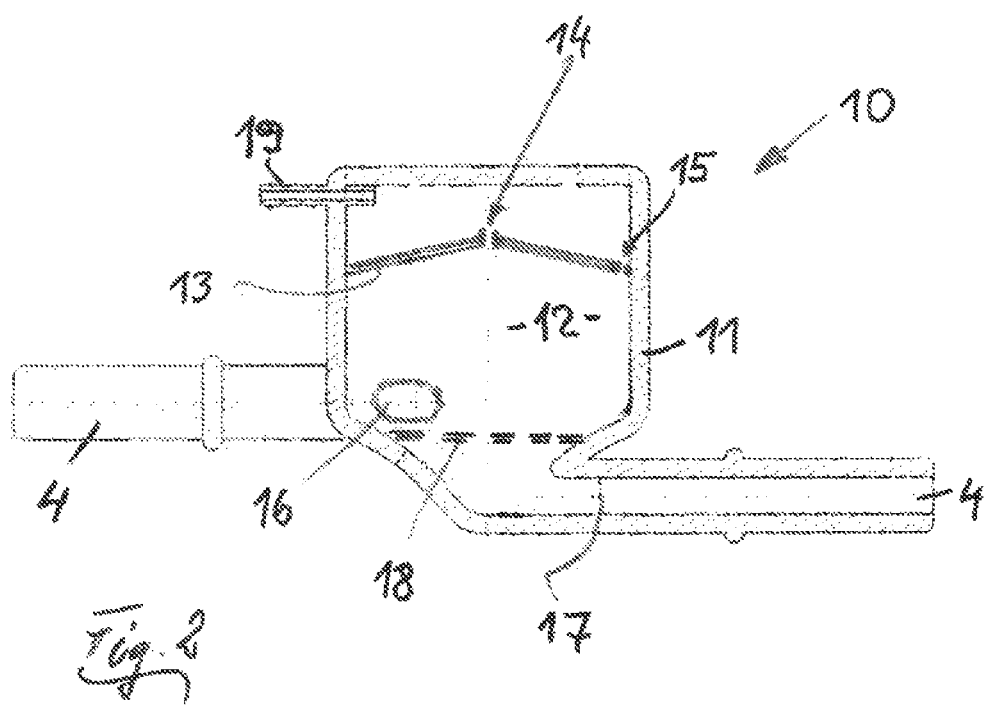

DEVICE FOR SUPPLYING A FLUID AT RISK OF FREEZING TO THE COMBUSTION CHAMBERS OF AN INTERNAL COMBUSTION ENGINE

BACKGROUND AND SUMMARY OF THE INVENTION

The invention relates to a device for feeding a liquid at risk of freezing into the combustion chambers of an internal combustion engine which in particular drives a motor vehicle, which device is furthermore designed to convey the liquid at risk of freezing at least from a portion of a supply line, through which the liquid passes from a reservoir to a feed device to the internal combustion engine, back to the reservoir. In particular, the liquid at risk of freezing is water, for which reason, below, practically only water will be discussed as liquid at risk of freezing, without this being intended to express a restriction to water (as liquid at risk of freezing).

In future, increasing use will be made of vehicle internal combustion engines in which water is admixed to the combustion of fuel at least at certain operating points. The water is preferably extracted from an on-board reservoir and conveyed by means of a conveying device to at least one injection valve which injects a certain water quantity for example into the air intake system of the internal combustion engine or into (in each case) one of the combustion chambers thereof. The latter may also be performed by virtue of the desired water also being injected through the existing fuel injection valves assigned to the individual combustion chambers of the (commonly multi-cylinder) internal combustion engine, specifically in the form of an emulsion which is formed in a high-pressure fuel pump to which, for the compression, aside from the fuel, and in a manner dependent on the respective operating point of the internal combustion engine, water is also fed.

In the case of such an embodiment, the high-pressure fuel pump may be referred to as a feed device for water within the meaning of the claims, or constitutes the feed device. In an alternative embodiment specified above, with (at least) one injection valve for water for example at the air intake system of the internal combustion engine, the one or possibly multiple injection valve(s) would be the feed device.

If, after operation in cold seasons, the motor vehicle is shut down for a period of time of several hours, water that is still situated in a supply line, for example to the high-pressure fuel pump or generally to a feed device via which the water ultimately passes into the internal combustion engine, could freeze. Then, after a restart of the internal combustion engine, a feed of water to the combustion chambers thereof would not be possible for a relatively long period of time. The supply line itself could also be damaged as a result of ice pressure. By contrast, small water fractions in an emulsion of fuel and a certain quantity of water are not detrimental—if such an emulsion is present at all.

To solve the above-stated problem, it is known, upon or after a shutdown of the vehicle, at least if required (specifically possibly in a manner dependent on the ambient temperature), for at least the water still situated in a certain region of the supply line to be returned in a suitable manner into a reservoir from which, during operation of the internal combustion engine, a conveying device conveys water as required to the feed device, for example to the high-pressure fuel pump. For example, the above-stated conveying device could be operated with a reversed conveying direction for this return action.

It is hereby now sought to highlight how this return action can be implemented in a reliable and simple manner. In particular, branching off from the supply line close to the feed device, there is provided an aeration valve via which, in the open state, the supply line is connected to the surroundings. An air separator-pressure accumulator structural unit connected to the supply line is provided downstream of this aeration valve as viewed in the direction toward the reservoir, which air separator-pressure accumulator structural unit is designed to at least partially separate air fractions out of the supply line, and out of the liquid situated in the supply line, in a portion situated at the top in the installed state, and to act as a pressure accumulator acting on the liquid in the supply line.

The content of the present invention is firstly to convey the water (as liquid at risk of freezing) situated in the supply line at least out of a portion of the supply line, ideally back into the reservoir, after a shutdown of the vehicle at least during cold seasons. Here, in order to minimize the outlay in terms of construction, this conveying action may basically be realized by means of an existing conveying device by reversal of the conveying direction thereof, by virtue of the conveying device drawing the water out of the supply line, specifically in an extensive region thereof, ideally up to as close as possible to an above-stated feed device. With the existing conveying device, during the operation of the internal combustion engine, the water is conveyed out of the reservoir to the feed device. As will be discussed further below, some other form of conveying of at least a fraction of the water situated in the supply line is however also possible with the present invention. However, before this is discussed in more detail, another feature of the invention will firstly be discussed.

Specifically, in order to ensure that the water is conveyed back successfully from at least a portion of the supply line situated close to the feed device, it should be possible for that end portion of the supply line which is situated close to the feed device to be aerated, for which reason, furthermore, an air line branch or the like should be provided which branches off from the supply line close to and upstream of the feed device in a return conveying direction (toward the reservoir) and which opens into the surroundings. During the conveying of water back in the direction of the reservoir, air can pass through this air line branch from the surroundings into the supply line, such that no negative pressure forms in the supply line as the water is conveyed back. In order to prevent dirt particles from passing from the surroundings into the supply line in the process, it is possible for an air filter device to be provided at the free end portion of this air line branch.

In order to prevent a situation in which, upon a restart of the motor vehicle or more specifically of the internal combustion engine thereof, water conveyed by the conveying device to the feed device passes through this abovementioned air line branch into the surroundings (or into the stated air filter device), a so-called aeration valve is provided in the stated air line branch, which aeration valve is normally closed and opens during the at least partial conveyance of water back from the supply line in the direction of the reservoir. This valve may be a check valve which opens in the direction of the reservoir, wherein the air line branch may also be formed only by this check valve, which then imparts a blocking action during the operation of the internal combustion engine and of the conveying device for water with a conveying direction toward the internal combustion engine or toward the stated feed device. Instead of a check valve, it is however also possible for a suitably activatable switching valve to be provided, which may furthermore likewise form the air line branch, such that the latter constitutes merely an optional feature.

By contrast, as a further essential feature, a pressure accumulator is provided which is provided in or coupled to the supply line and which, here, in a particular embodiment, forms a structural unit with an air separator and is therefore referred to as "air separator-pressure accumulator structural unit". By means of the air separator integrated in this structural unit, it is possible for air or air fractions to be at least partially separated out from the supply line, and from the liquid situated in the supply line, in a portion (of the structural unit) which is situated at the top in the installed state, specifically from the water that is then situated in a lower region (in the installed state in the vehicle) of this structural unit. For as long as water is conveyed into the supply line and thus also into the air separator-pressure accumulator structural unit by means of the abovementioned conveying device, a positive pressure in relation to ambient pressure builds up in the structural unit or in its portion which contains substantially only water, as long as the feed device and the above-stated aeration valve are blocked such that no water is discharged from the supply line through these elements. Simply owing to the fact that the air separator-pressure accumulator structural unit has a significant volume, which may for example be approximately equal to the total volume of the supply line, this structural unit can thus act as a pressure accumulator for the water situated in the supply line. Furthermore, in the description and in part also in the patent claims, only the expression "structural unit" is used, and this denotes the air separator-pressure accumulator structural unit according to the invention.

Referring now to the pressure accumulator function of this structural unit, it is in particular possible, by means of the liquid pressure which is, as it were, stored therein (also in interaction with gravitational force), for water to be conveyed back in the direction of the reservoir from a portion of the supply line which is situated close to the feed device or to the aeration valve. Thus, if the feed device is shut off and a tank shut-off valve provided in the supply line close to the reservoir is open and also the aeration valve mentioned further above is open, and the stated conveying device is not in operation, then at least a certain quantity of water will flow of its own accord from the pressure accumulator and thus also from a portion of the supply line situated close to the feed device back into the reservoir. Here, the installation height of the individual components of a device according to the invention in the vehicle, measured above the roadway, self-evidently has a significant influence on the quantity of water that passes back into the reservoir from the supply line. However, in interaction with the pressure accumulator of the structural unit, there is always a sufficient quantity of water that flows back into the reservoir, because the feed device is commonly situated in the vehicle high above the roadway, or is spaced apart further than the reservoir from the roadway as viewed in a vertical axis direction of the vehicle.

A pressure accumulator provided in accordance with the invention furthermore has the advantage that, with a pressure accumulator of the type, the conveying device for water does not have to be operated continuously, and it is nevertheless possible as required, specifically in a manner dependent on the respective operating point of the internal combustion engine, for a certain quantity of water for the feed device to be provided rapidly. For this purpose, the pressure accumulator is advantageously situated as close as possible to the feed device, wherein, in the supply line, downstream of the pressure accumulator as viewed in a conveying direction of the conveying device (during operation of the internal combustion engine), there may be provided firstly an electronically activatable so-called engine shut-off valve and, possibly, downstream thereof, also an electronically activatable dosing valve, before the supply line opens into the feed device, for example the high-pressure fuel pump. The stated engine shut-off valve is closed when the internal combustion engine is not in operation.

In one possible embodiment, the air separator-pressure accumulator structural unit is in the form of a container, in the for example approximately circular cylindrical volume of which, in a portion situated at the top in the installed state in the vehicle, there is provided a partition equipped with a narrow passage opening. As long as air is situated in the supply line, upon a commencement of operation of the conveying device and thus with conveyance of water into the supply line, this air passes into the structural unit, and, in the latter, can easily pass through the stated narrow passage opening, whereas, as soon as water is conveyed into the structural unit, the passage of the water is significantly impeded by the narrow passage opening. With further conveyance of water by the conveying device, a positive pressure will then build up in the structural unit below the partition and will be maintained, that is to say stored, therein for a certain period of time. In order that the air that passes from the supply line to the partition in the structural unit according to the invention can accumulate as best as possible close to the passage opening provided in the partition, the partition may be of conical design, wherein the passage opening is situated in the cone tip situated at the highest point, that is to say at the point spaced apart furthest from the roadway, with respect to the partition. In order, by contrast, to allow water that passes through the passage opening to pass back into the system, that is to say into the supply line, at any rate after the described positive pressure has been dissipated, it is preferably possible for a water discharge opening of suitably small dimensions to be provided in an edge portion, and in particular in an edge portion of a conical partition as described.

As described, upon a commencement of operation of the conveying device after a shutdown of the internal combustion engine, and thus in the case of an at least partially evacuated supply line, air firstly, in terms of time, accumulates in that region of the structural unit which is situated on the other side of the partition as viewed from the supply line, which air can then act as an air cushion which assists the pressure accumulator function of the structural unit, if—as is preferred—an escape of this air into the surroundings is prevented. In particular, it is proposed that the abovementioned aeration valve be connected to this stated region situated on the other side of the partition, which aeration valve—as already discussed—is opened only after a shutdown of the internal combustion engine for a desired conveyance of at least a part of the water situated in the supply line back into the reservoir, specifically ideally only after the positive pressure previously prevailing in the air separator-pressure accumulator structural unit has been dissipated. As has already been mentioned, it is thus the case that, upon a shutdown of the internal combustion engine at least in the presence of relatively low ambient temperatures in the case of which there is the risk of freezing of the water in the supply line, at least a part of the supply line is evacuated, that is to say, from at least one portion of the supply line, water situated therein is conveyed back into the reservoir. For this purpose, the prevailing positive pressure in the air separator-pressure accumulator structural unit is firstly utilized, and, after this has been dissipated, the stated aeration valve is opened.

Referring now in more detail to the design of the air separator-pressure accumulator structural unit according to the invention, an inlet opening, connected to the supply line, of this structural unit may open tangentially into an at least approximately circular cylindrical interior space of this structural unit. In this way, a cyclone effect can be realized which, if water mixed with air passes into the interior space of the structural unit, and in the latter is caused to form a circular flow owing to the tangential inlet, a successful separation of air from the water can be promoted. It is furthermore proposed for the inlet opening, connected to the supply line, of the air separator-pressure accumulator structural unit to be provided, in the installed state, above (that is to say so as to be spaced apart further from the roadway in a vehicle vertical axis direction in relation to) a line piece which conducts the water onward out of the structural unit and which branches off from the lowest point of the structural unit in the installed state. This further line piece constitutes a constituent part of the supply line which then ultimately leads to the feed device. With this measure, it is ensured that no air but rather, as desired, only water passes to the feed device, wherein a maximum possible inclination of the structural unit (and thus of the vehicle) with regard to this desired freedom from air is defined by the height difference between the inlet opening of the structural unit and the line piece.

Furthermore, in the liquid-filled volume of the air separator-pressure accumulator structural unit, a filter with capillary action may be provided so as to be situated between the inlet opening and a or the line piece which conducts the water (or the liquid at risk of freezing) onward out of the structural unit and so as to at the same time cover the cross section of the stated volume. Such filters are basically known to a person skilled in the art. Water must therefore pass through this filter, wherein it is not only the case that undesired particles are retained but, owing to the capillary action, air is also separated off in a particularly effective manner. It is self-evidently also possible for another, simpler filter element to be provided in this region, which filter element can likewise promote improved air separation.

An exemplary embodiment of the invention is shown in the appended figures, which are described below, and which may contain further inventive features.

BRIEF DESCRIPTION OF THE DRAWINGS

FIG. 1 shows a basic arrangement of only those elements or constituent parts which are necessary for the understanding of the invention.

FIG. 2 shows, in a section, an air separator-pressure accumulator structural unit according to an embodiment of the invention.

DETAILED DESCRIPTION OF THE DRAWINGS

Referring firstly to FIG. 1, the reference designation 1 denotes a high-pressure fuel pump of an internal combustion engine (not illustrated) which functions as a drive assembly of a motor vehicle (likewise not shown). This high-pressure fuel pump 1 not only compresses fuel to be fed to the internal combustion engine but also admixes water to the fuel at selected operating points of the internal combustion engine. The present invention is concerned with a device for feeding water generally to a feed device for an internal combustion engine, wherein, in the present exemplary embodiment, the high-pressure fuel pump 1 functions as a feed device of this type, for which reason the reference designation 1 is likewise used below for the expression or object "feed device".

The water to be fed to the feed device 1 (or a high-pressure fuel pump 1) is extracted from a reservoir 2 situated on board the motor vehicle by means of a conveying device 3a (=pump), to the conveying outlet of which there is connected a supply line 4, which ultimately leads to the feed device 1. A tank shut-off valve 3b is provided in this supply line 4 very close to the conveying device 3a and the reservoir 2. The tank shut-off valve is followed, further downstream (as viewed in the conveying direction of the conveying device 3a) in the supply line 4, by a fine filter 5 and, following this, already relatively close to the feed device 1, an air separator-pressure accumulator structural unit 10. Proceeding from this structural unit 10, the supply line 4 continues to a so-called engine shut-off valve 6a assigned to the internal combustion engine, downstream of which engine shut-off valve there is positioned a dosing valve 6b, proceeding from which the supply line 4 then opens out in the feed device 1. An air line branch 7 branches off from the air separator-pressure accumulator structural unit 10, which air line branch opens out in the surroundings U via an aeration valve 8 and a filter element 9 positioned upstream or downstream thereof.

Referring now to FIG. 2, this figure shows a possible embodiment of an air separator-pressure accumulator structural unit 10 in more detail. This structural unit 10 is composed firstly of an approximately circular cylindrical housing 11 with an internal volume 12. The figures illustrate this structural unit 10 in an installed position or in the installed state in the motor vehicle, that is to say the vehicle vertical axis runs vertically in the plane of the drawing, and the roadway on which the vehicle is standing is situated a significant distance below this structural unit 10. In the internal volume 12 thereof, in the upper region (for example at 75% of the height of the internal volume 12), there is provided a partition 13 which extends substantially completely over the (horizontal) cross section of this internal volume 12 and which in this case has the shape of a cone with a relatively large cone angle (in the range of, for example, 160°) and at its cone tip there is provided a relatively narrow passage opening 14. In a narrow edge region over the (outer) circumference of the partition 13, there is also provided a water discharge opening 15.

At a relatively great distance below the partition 13, via an inlet opening 16 provided in the cylindrical wall or in the housing 11 of the structural unit 10, the supply line 4 extending from the conveying device 3a opens substantially tangentially into the internal volume 12 of the structural unit 10, that is to say the supply line 4 opens substantially tangentially into the internal volume 12, such that the water conveyed in through the supply line 4 with a certain pressure performs in the internal volume 12 a vortex-like rotation of flow about the cylinder axis of the substantially cylindrical internal volume 12. As viewed from the lowest region or point, that is to say that region or point which is situated lowest as viewed in the vehicle vertical axis direction, of the structural unit 10, a line piece 17 extends from the internal volume 12 of the structural unit, through which line piece the water fed through the inlet opening 16 is discharged from the structural unit 10 again. This line piece 17, which in this case extends away centrally in the region of the cylinder axis at the base of the substantially circular cylindrical housing 11 of the structural unit 10, transitions into the supply line 4 leading to the engine shut-off valve 6a (cf. FIG. 1), or forms the portion of the supply line 4. In the internal volume 12 of the structural unit 10, between the inlet opening 16 and the start of the line piece 17 as viewed in the vertical direction or vertical axis direction, there is furthermore provided a filter element or filter 18 which extends over the entire (horizontal) cross section of the internal volume and through which the water conveyed in through the inlet opening 16 must pass in order to pass into the line piece 17. At this filter 18, a particularly effective separation of air or air bubbles that are possibly contained in the water is realized owing to the design of the filter with a capillary action.

Furthermore, on the structural unit 10 or on the housing 11 thereof, there is provided a connector 19 which extends away from the internal volume 12 above the partition 13 and which serves for the air line branch 7 discussed on the basis of FIG. 1. Via this connector 19, the air that is separated off in the structural unit 10 is discharged into the air line branch 7, which air then, as long as the aeration valve 8 is closed, functions as an (additional) compressed-air cushion for the pressure accumulator formed by the structural unit 10 and described in detail prior to the description of the figures. Furthermore, the figures do not show an electronic control and processing unit which suitably activates the conveying device 3a, the tank shut-off valve 3b, the engine shut-off valve 6a and the engine dosing valve 6b and the aeration valve 8 in a manner dependent on the operating state or operating point of the internal combustion engine. This is performed as has already been described further above, and will be summarized once again below:

When the internal combustion engine is in a shut-down state, no water should be situated in the supply line 4 downstream (as viewed in the conveying direction of the conveying device 3a) of the fine filter 5 and within the fine filter 5, installed in a vertical direction, in a region thereof situated at the top, whereas, during operation of the internal combustion engine, the supply line 4 is completely filled, and the air separator-pressure accumulator structural unit 10 is filled in the internal volume region below the partition 13, with water which has been extracted from the reservoir 2 and which is at pressure or positive pressure in relation to ambient pressure. In order to now satisfy this stated requirement, upon a shutdown of the internal combustion engine, the engine shut-off valve 6a is closed, and the previously possibly closed tank shut-off valve 3b is opened, wherein the conveying device 3a is not (is no longer) in operation. This has the result that, owing to the positive pressure in the air separator-pressure accumulator structural unit 10 and in the supply line 4, a fraction of the water contained in these aforementioned structural elements passes back into the reservoir 2. After this positive pressure has been dissipated, which can be ascertained by means of a pressure sensor which is not shown in the figures, the stated electronic control and processing unit opens the (previously closed) aeration valve 8, whereby air can pass from the surroundings via the air line branch 7 into the system, that is to say through the structural unit 10 into the supply line 4, which causes a further outflow of water still situated therein into the reservoir 2, which is situated at a lower level as viewed in the vehicle vertical axis direction. In the present exemplary embodiment specifically realized here, the region between the fine filter 5 and the engine shut-off valve 6a is completely evacuated, and the fine filter 5 is half-evacuated, which, for reasons not discussed in any more detail, is sufficient to prevent damage as a result of freezing of water in the case of a relatively long period of standstill of the motor vehicle and correspondingly low ambient temperatures. To complete this described water discharge process, which follows a shutdown of the internal combustion engine (for a relatively long period of time) and within which water is conveyed back into the reservoir 2, the tank shut-off valve 3b and the aeration valve 8 are closed.

Upon a resumption of operation of the internal combustion engine, it is possible, in those regions of the installation shown in FIG. 1 or of the system shown in FIG. 1 where water may indeed freeze, for an electric heating device (not shown) to initially thaw this frozen water. Thereafter, by means of a commencement of operation of the conveying device 3a, the installation shown or the system shown can be filled with water after the tank shut-off valve 3b has been opened. Since, here, it is necessary that no air passes to the feed device 1, the engine shut-off valve 6a initially remains closed. The conveying device 3a now conveys water in the direction of the closed engine shut-off valve 6a and until such time as the space in the internal volume 12 of the air separator-pressure accumulator structural unit 10 has been completely filled with water at a certain positive pressure, which can be detected by means of a suitably provided pressure sensor (already mentioned above) which is not shown in the figures. During the course of this filling process, as has already been discussed in detail prior to the description of the figures, the air that was previously situated in the supply line 4 passes through the narrow passage opening 14 in the partition 13 into the air line branch 7 and is buffered there. Upon completion of this described filling process, the engine shut-off valve 6a can be opened.

A description has already been given above of the further functioning of the structural unit 10, in particular also the capability thereof, during the operation of the internal combustion engine, when the engine shut-off valve 6a is open and the dosing valve 6b is open, to separate out air that is possibly contained in the water conveyed in from the reservoir 2. It is additionally also mentioned that, when no positive pressure is prevailing in the supply line 4, possibly small water quantities which, in the structural unit 10, pass through the passage opening 14, which performs the function of aperture, in the partition 13 can pass via the water discharge opening 15 back into that region of the internal volume 12 which is situated below the partition 13.

What is claimed is:

1. A device for feeding a liquid at risk of freezing into combustion chambers of an internal combustion engine that drives a motor vehicle, which device is designed to convey the liquid at risk of freezing at least from a portion of a supply line, through which the liquid passes from a reservoir to a feed device to the internal combustion engine, back to the reservoir, comprising:

an aeration valve arranged at a branch off from the supply line close to the feed device, via which aeration valve, in an open state, the supply line is connected to an outer environment; and an air separator-pressure accumulator structural unit connected to the supply line arranged downstream of the aeration valve as viewed in a direction toward the reservoir, wherein the air separator-pressure accumulator structural unit is designed to at least partially separate air fractions out of the supply line and out of the liquid located in the supply line in a portion of the air separator-pressure accumulator structural unit situated at a top in an installed state, and to act as a pressure accumulator acting on the liquid in the supply line.

2. The device according to claim 1, wherein
the air separator-pressure accumulator structural unit is in a form of a container, and
a partition which is equipped with a narrow passage opening is provided in an internal volume in a portion situated at the top in the installed state in the vehicle.

3. The device according to claim 2, wherein
the partition is of conical design, and
the passage opening is situated in a cone tip.

4. The device according to claim 3, wherein
a water discharge opening is provided in an edge portion of the partition.

5. The device according to claim 1, wherein
an inlet opening, connected to the supply line, of the air separator-pressure accumulator structural unit opens tangentially into an at least approximately circular cylindrical interior space of the structural unit.

6. The device according to claim 1, wherein
an inlet opening, connected to the supply line, of the air separator-pressure accumulator structural unit is, in the installed state, provided above a line piece which conducts the liquid at risk of freezing onward out of the structural unit, and
the line piece functions as a constituent part of the supply line and branches off from a lowest point of the structural unit in the installed state.

7. The device according to claim 6, wherein
in the liquid-filled volume of the structural unit, a filter with capillary action is provided so as to be situated between the inlet opening and the line piece which conducts the liquid at risk of freezing onward out of the structural unit and so as to at the same time cover a cross section of the volume.

8. The device according to claim 1, wherein
the air separator-pressure accumulator structural unit is, as viewed in a flow direction of the liquid toward the feed device, provided in the supply line upstream of a shut-off valve which is closed when the internal combustion engine is not in operation.

* * * * *